US010850197B1

(12) United States Patent
Hellam et al.

(10) Patent No.: US 10,850,197 B1
(45) Date of Patent: Dec. 1, 2020

(54) GUIDED INTERACTIONS WITH BOOKS

(71) Applicant: Disney Enterprises, Inc., Burbank, CA (US)

(72) Inventors: Taylor Hellam, Fresno, CA (US); Malcolm Murdock, Los Angeles, CA (US); Mohammad Poswal, Santa Clarita, CA (US); Shawnna Stewart, Sherman Oaks, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 16/410,884

(22) Filed: May 13, 2019

(51) Int. Cl.
| | |
|---|---|
| *A63F 13/00* | (2014.01) |
| *A63F 13/47* | (2014.01) |
| *A63F 13/48* | (2014.01) |
| *G06K 19/06* | (2006.01) |
| *A63F 13/80* | (2014.01) |
| *B42D 1/00* | (2006.01) |

(52) U.S. Cl.
CPC .............. *A63F 13/47* (2014.09); *A63F 13/48* (2014.09); *A63F 13/80* (2014.09); *B42D 1/009* (2013.01); *G06K 19/06037* (2013.01); *A63F 2300/609* (2013.01)

(58) Field of Classification Search
CPC ... G09B 5/02; G09B 5/00; G09B 5/06; G09B 5/062
See application file for complete search history.

(56) References Cited

U.S. PATENT DOCUMENTS

| | | | | |
|---|---|---|---|---|
| 6,010,405 A | * | 1/2000 | Morawiec | A63F 13/005 463/33 |
| 2006/0258419 A1 | * | 11/2006 | Winkler | A63F 13/52 463/1 |
| 2012/0311564 A1 | * | 12/2012 | Khalid | H04L 67/1097 718/1 |
| 2013/0073932 A1 | * | 3/2013 | Migos | G06F 3/0483 715/201 |

* cited by examiner

*Primary Examiner* — Omkar A Deodhar
*Assistant Examiner* — Eric M Thomas
(74) *Attorney, Agent, or Firm* — Farjami & Farjami LLP

(57) ABSTRACT

A system for providing guided interactions with books includes a content delivery terminal communicatively coupled to a computing platform including a hardware processor and a memory storing a content delivery software code, a content registry, and a library of entries corresponding respectively to multiple interaction plans for guiding an interaction with a book. The hardware processor executes the content delivery software code to detect, via the content delivery terminal, a book corresponding to content included in the content registry, and to identify an interaction plan for the guided interaction based on one or more of the content and a user input received by the content delivery terminal. The content delivery software code further identifies a first portion of the content for use in initiating the interaction plan, and outputs the first portion of the content to the content delivery terminal for printing by the content delivery terminal in the book.

20 Claims, 5 Drawing Sheets

GUIDED INTERACTIONS WITH BOOKS

BACKGROUND

The convenience of modern electronic based information technologies have increasingly lured attention from print media, and especially books, which typically require more time and attention to absorb. To the extent that electronic alternatives to the type of information previously available only in print enable the acquisition of knowledge with greater efficiency, those advances are beneficial. However, as we collectively turn with increasing frequency away from books and towards their electronic substitutes, we become estranged from an approach to knowledge and learning that has played a major role in shaping the foundations of our culture.

One advantage of books is that they may provide an easy intimacy with the written word that is not readily replaced by electronic information content, despite its utility. That may not be the case for some young people, however, for whom educational content, entertainment content, and even literature are increasingly electronically based. To many of today's technologically proficient children and young adults, books may be unfamiliar or even relatively unknown, and may be considered off-putting as a result. This is an undesirable state of affairs, however, because the relationship between books and human beings is special and symbolic, and to lose touch with books is to lose touch with a portion of our intellectual heritage.

SUMMARY

There are provided systems and methods for providing guided interactions with books, substantially as shown in and/or described in connection with at least one of the figures, and as set forth more completely in the claims.

DETAILED DESCRIPTION

Figure 1:
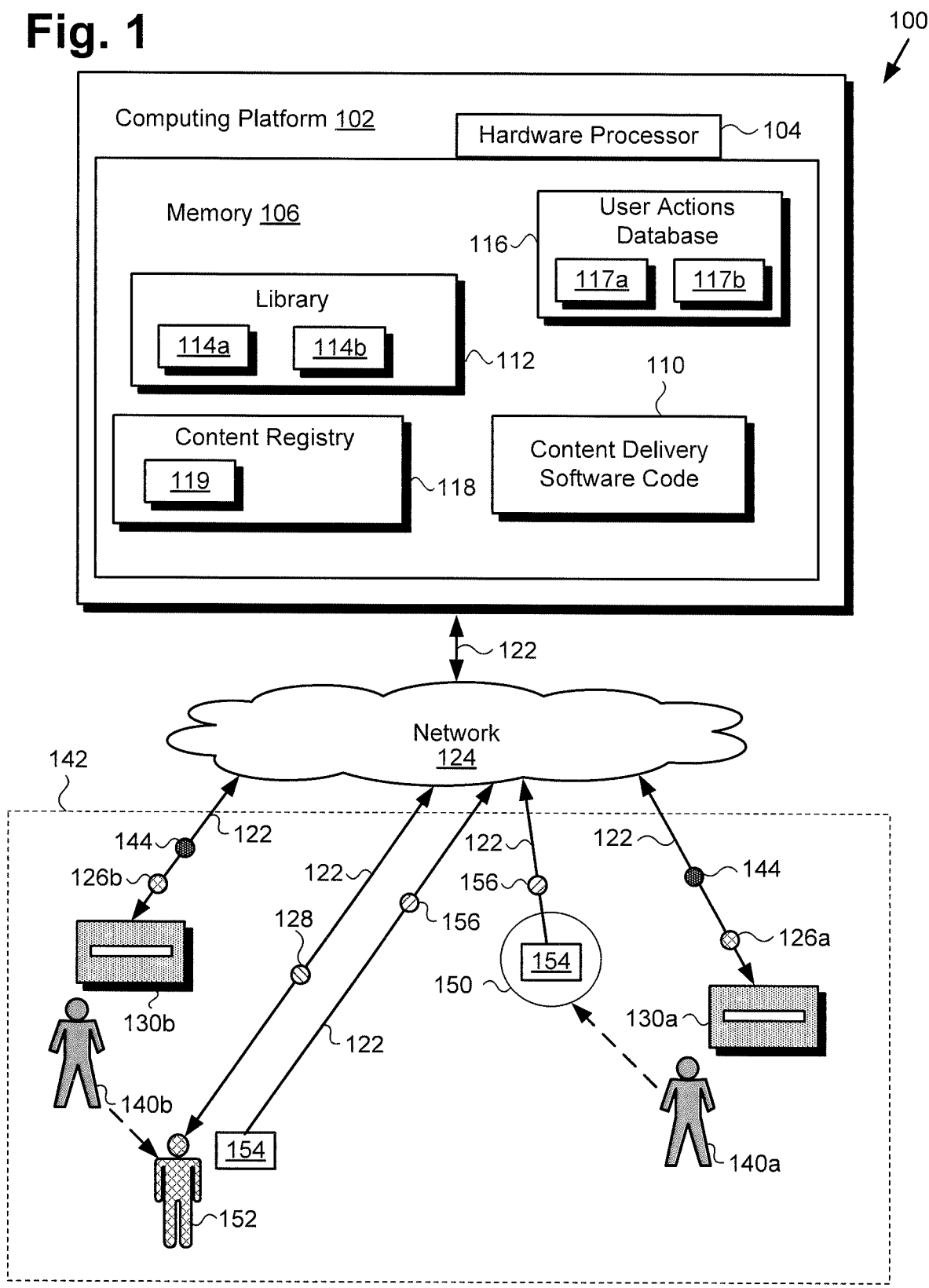
FIG. 1 shows a diagram of an exemplary system for providing guided interactions with books, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, the convenience of modern electronic based information technologies have increasingly lured attention from print media, and especially books, which typically require more time and attention to absorb. To the extent that electronic alternatives to the type of information previously available only in print enable the acquisition of knowledge with greater efficiency, those advances are beneficial. However, as we collectively turn with increasing frequency away from books and towards their electronic substitutes, we become estranged from an approach to knowledge and learning that has played a major role in shaping the foundations of our culture.

As further stated above, one advantage of books is that they may provide an easy intimacy with the written word that is not readily replaced by electronic information content, despite its utility. However, that intimacy with the written work may not be shared by some young people, for whom educational content, entertainment content, and even literature are increasingly electronically based. To many of today's technologically proficient children and young adults, books may be unfamiliar or even relatively unknown, or may even seem off-putting, which is unfortunate and undesirable.

The present application addresses and overcomes the deficiencies in the conventional art by disclosing systems and methods for providing interactive experiences with books. The present solution includes identifying a storyline or other plan for use in guiding interactions with a system user based on content corresponding to a book detected as being in the user's possession. Moreover, by identifying a portion of the content for use in informing or instructing the user based on content and/or inputs provided by the user, the present solution enables the generation of an interactive experience that is responsive to the user in real-time. Furthermore, by printing the content into the book in a piecemeal fashion in response to actions by the user, the present solution enables the spontaneous generation of an interactive experience that evolves coherently from the initial interaction with the user.

It is noted, that as defined for the purposes of the present application, the expression "user" refers to a user/participant or to a group of user/participants in an interactive experience that is guided by the systems and according to the methods disclosed herein. Thus, a system user may refer to an individual person, such as a participant in a participatory story or game, or a group of individual persons, such as the entire group of participants or some subset of the participants in the participatory story or game.

It is also noted, that as further defined for the purposes of the present application, the expression "system agent" refers to a human, automated, or virtual agent that may or may not be in interactive communication with the systems disclosed herein. Thus, in some implementations, a system agent may refer to a human agent, such as an actor portraying a character included in a storyline. Alternatively, in some implementations, a system agent may refer to an automated agent, such as a robot or other type of machine. As yet another alternative, a system agent may refer to a virtual character rendered electronically on display.

FIG. 1 shows a diagram of exemplary system 100 for providing guided interactions with books, according to one implementation. System 100 includes one or more content delivery terminals 130*a* and 130*b* (hereinafter "content delivery terminal(s) 130*a*/130*b*") communicatively coupled to computing platform 102. As shown in FIG. 1, computing platform 102 includes hardware processor 104 and memory 106 implemented as a non-transitory storage device. As further shown in FIG. 1, memory 106 stores content delivery software code 110, content library 112 including entries 114a and 114b, user actions database 116 including user activity profiles 117a and 117b, and content registry 118 including content 119.

In addition, FIG. 1 shows one or more system users 140a and 140b (hereinafter "system user(s) 140a/140b"), interaction site 150, system agent 152, and one or more sensors 154 (hereinafter "sensor(s) 154"). According to the exemplary implementation shown in FIG. 1, sensor(s) 154, system agent 152, and content delivery terminal(s) 130a/130b are in communication with computing platform 102 via communication network 124 and network communication links 122.

As further shown in FIG. 1, content delivery terminal(s) 130a/130b, system user(s) 140a/140b, interaction site 150, system agent 152, and sensor(s) 154 are located in venue 142, which may be a retail store, a theme park, a resort property, or a cruise ship, for example. It is noted that sensor(s) 154 of system 100 may include a radio-frequency identification (RFID) reader, a Quick Response (QR) reader, facial recognition (FR) sensors, voice sensors, object recognition (OR) sensors, and/or any suitable sensor(s) for detecting system user(s) 140a/140b and/or an object, such as a book, in the possession of system user(s) 140a/140b. Also shown in FIG. 1 are system agent interaction data 128, terminal interaction data 144, first portion 126a of content 119, second portion 126b of content 119, and sensor data 156.

Content 119 may include digital content in the form of a digital text, graphics, or a game, for example. Entries 114a and 114b of content library 112 correspond respectively to interaction plans for a guided interaction including content 119. That is to say, where content 119 is a story, the guided interaction provided by system 100 and including content 119 may be a guided narrative, and the interaction plans corresponding to entries 114a and 114b may be alternative storylines for the guided narrative. Alternatively, a guided interaction provided by system 100 and including content 119 may be a game, such as a scavenger hunt, for example, and the interaction plans corresponding to entries 114a and 114b may be alternative series of instructions to be completed by system user 140a and/or 140b participating in the game.

Although the present application refers to content delivery software code 110, content library 112 including entries 114a and 114b, user actions database 116 including user activity profiles 117a and 117b, and content registry 118 including content 119 as being stored in memory 106 for conceptual clarity, more generally, memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts system 100 as including single computing platform 102, that representation is also merely exemplary. More generally, system 100 may include one or more computing platforms, such as computer servers for example, which may form an interactively linked but distributed system, such as a cloud based system, for instance. As a result, hardware processor 104 and memory 106 may correspond to distributed processor and memory resources within system 100. In one such implementation, computing platform 102 may correspond to one or more web servers, accessible over a packet-switched network such as the Internet, for example. Alternatively, computing platform 102 may correspond to one or more computer servers supporting a wide area network (WAN), a local area network (LAN), or included in another type of limited distribution or private network.

Figure 2:
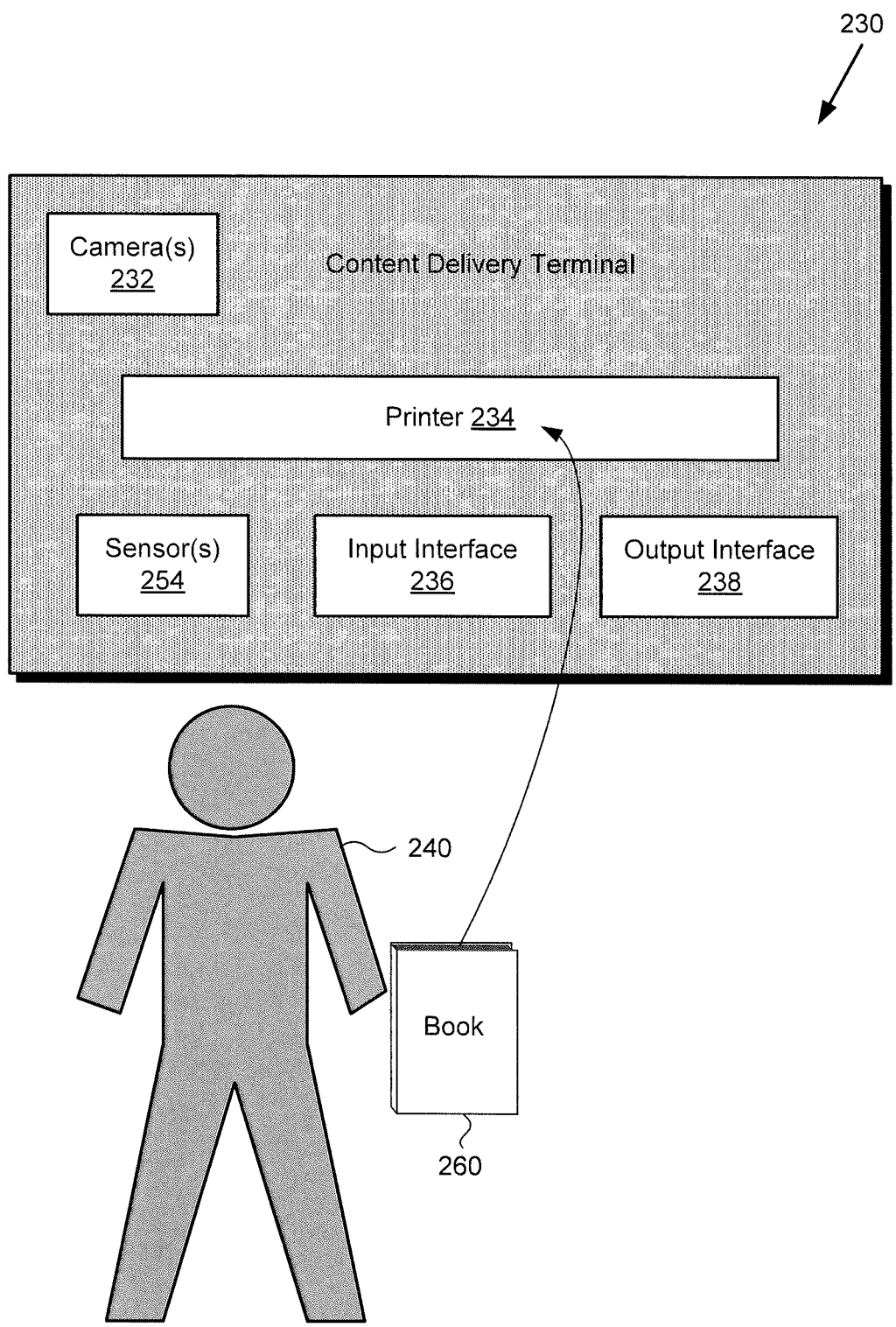
FIG. 2 shows a diagram of an exemplary content delivery terminal suitable for use in the system of FIG. 1, according to one implementation.

FIG. 2 shows a diagram of exemplary content delivery terminal 230 suitable for use in system 100, in FIG. 1, according to one implementation. As shown in FIG. 2, content delivery terminal 230 includes one or more cameras 232 (hereinafter "camera(s) 232"), printer 234, input interface 236, sensor(s) 254, and optional output interface 238. Also shown in FIG. 2 are system user 240 and book 260 in possession of system user 240. It is noted that book 260 may be initially blank, or substantially so. It is further noted that content delivery terminal 230 is configured to print one or more portions of content 119 in book 260 using printer 234, in response to a content identifier included in book 240, and/or an input to input interface 236 by system user 240, and/or completion of one or more instructions by system user 240.

Content delivery terminal 230 and system user 240 correspond respectively in general to content delivery terminal(s) 130a/130b and system user(s) 140a/140b, in FIG. 1. Consequently, content delivery terminal(s) 130a/130b and system user(s) 140a/140b may share any of the characteristics attributed to respective content delivery terminal 230 and system user 240 by the present disclosure, and vice versa. Thus, although not shown in FIG. 1, system user(s) 140a/140b may be in possession of a book corresponding to book 260. Moreover, and although not shown in FIG. 1, content delivery terminal(s) 130a/130b may include features corresponding respectively to camera(s) 232, printer 234, input interface 236, sensor(s) 254, and optional output interface 238.

Camera(s) 232 may include one or more still image black and white or red-green-blue (RGB) camera(s), and/or one or more black and white or RGB video camera(s), and/or one or more RGB-D cameras equipped with a depth sensor, and/or one or more infrared (IR) camera(s), for example. Printer 234 may be implemented as a laser printer, inkjet printer, dye-sublimation printer, or thermal printer, to name a few examples. Moreover, in some implementations, printer 234 may take the form of a stamping device configured to stamp one or more portions of content 119 on at least one page of book 260.

Input interface 236 may be implemented as a keyboard or touchscreen, for example. In some implementations, input interface 236 may include a microphone, and may be configured to be responsive to voice inputs from system user(s) 140a/140b/240. Optional output interface 238 may include a speaker for providing audio output, and/or a display. When output interface 238 is implemented so as to include a display, the display may take the form of a liquid crystal display (LCD), a light-emitting diode (LED) display, an organic light-emitting diode (OLED) display, or another suitable display screen that performs a physical transformation of signals to light.

Sensor(s) 254 correspond in general to sensor(s) 154, in FIG. 1, and may share any of the characteristics attributed to sensor(s) 154 by the present disclosure. That is to say, like sensor(s) 154, sensor(s) 254 may include an RFID reader, a QR reader, FR sensors, voice sensors, OR sensors, and/or any suitable sensor(s) for detecting system user(s) 140a/140b/240 and/or an object, such as book 260, in the possession of system user(s) 140a/140b/240.

Figure 3A:
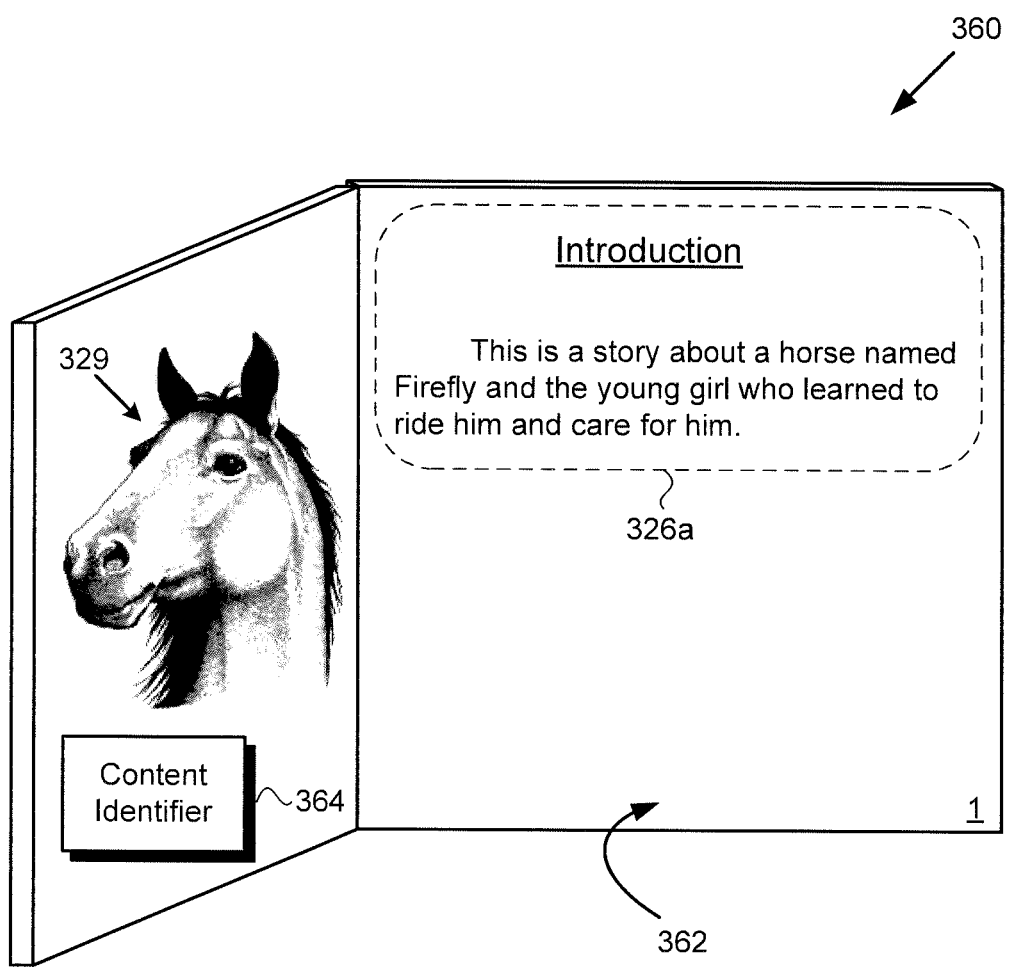
FIG. 3A shows an exemplary book utilized in conjunction with the system of FIG. 1 at an initial interaction stage, according to one implementation.
Figure 3B:
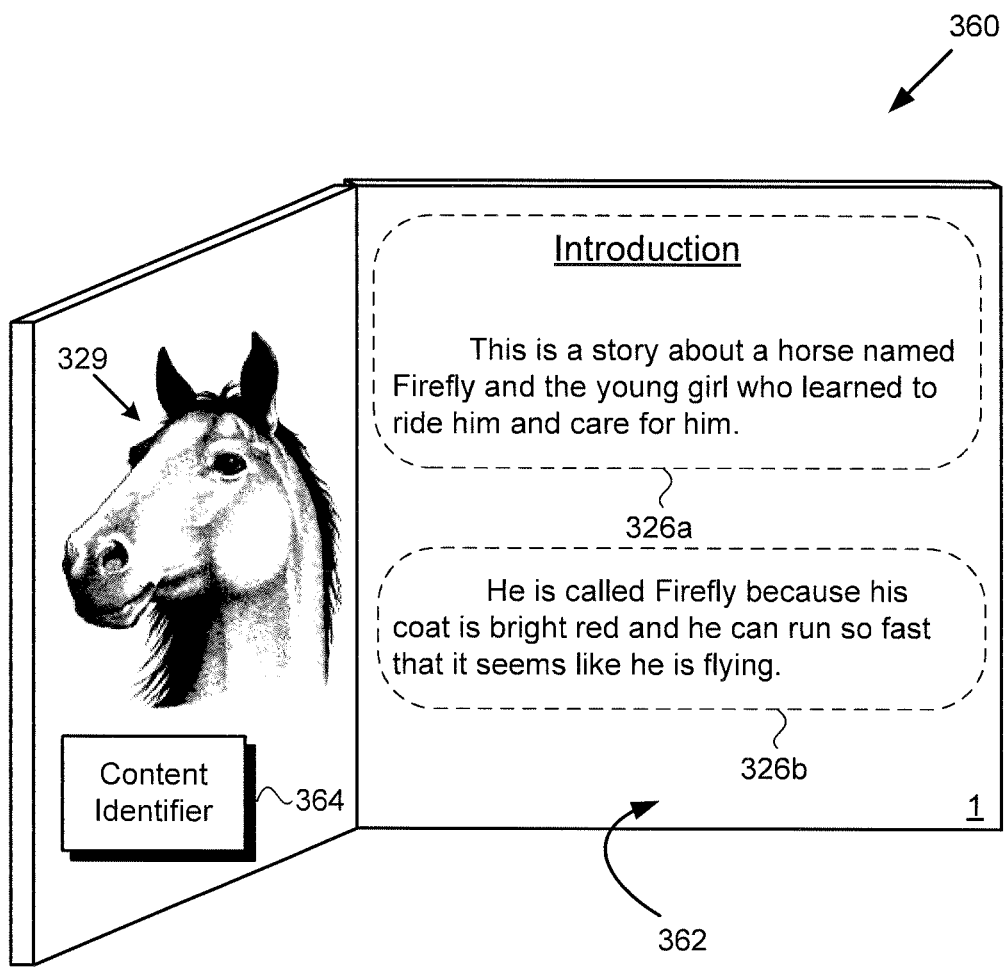
FIG. 3B shows the exemplary book of FIG. 3A at a subsequent interaction stage, according to one implementation.

FIG. 3A shows exemplary book 360 utilized in conjunction with system 100, in FIG. 1, at an initial interaction stage, while FIG. 3B shows exemplary book 360 at a subsequent interaction stage, according to one implementation. As shown in FIG. 3A, book 360 includes multiple enumerated pages 362 and content identifier 364, which may be implemented as an RFID tag, for example. Also shown in FIG. 3A is first portion 326a of content 119, in FIG. 1, which has been printed on one of enumerated pages 362 by one of content delivery terminal(s) 130a/130b/230 using printer 234. It is noted that, according to the exemplary implementation shown in FIGS. 3A and 3B, first portion 326a of content 119 includes graphical image 329 as well as text.

In addition to the features shown in FIG. 3A, FIG. 3B shows book 360 having second portion 326b of content 119 printed on one of enumerated pages 362. Like first portion 326a of content 119, second portion 326b of content 119 may be printed in book 360 by one of content delivery terminal(s) 130a/130b/230 using printer 234. However, it is noted that each of first portion 326a and second portion 326b of content 119 may be printed in book 360 by a different one of content delivery terminal(s) 130a/130b/230.

For example, and referring to FIG. 1, first portion 126a and second portion 126b of content 119 correspond respectively to first portion 326a and second portion 326b of content 119, shown in FIGS. 3A and 3B. As shown in FIG. 1, first portion 126a/326a of content 119 may be printed in book 360 by content delivery terminal 130a, while second portion 126b/326b of content 119 may be printed in book 360 by content delivery terminal 130b. It is further noted that although FIG. 3B shows first portion 126a/326a and second portion 126b/326b of content 119 printed on the same page, in other implementations, first portion 126a/326a and second portion 126b/326b of content 119 may be printed on different pages of enumerated pages 362.

Book 360 corresponds in general to book 260, in FIG. 2. Thus, book 260 may share any of the characteristics attributed to book 360 by the present disclosure, and vice versa. That is to say, although not shown in FIG. 2, book 260 may share features corresponding respectively to enumerated pages 362 and content identifier 364. As noted above, content identifier 364 may take the form of an RFID tag. However, in other implementations, content identifier 364 may be a numeric or alphanumeric code, or a QR code, for example.

Figure 4:
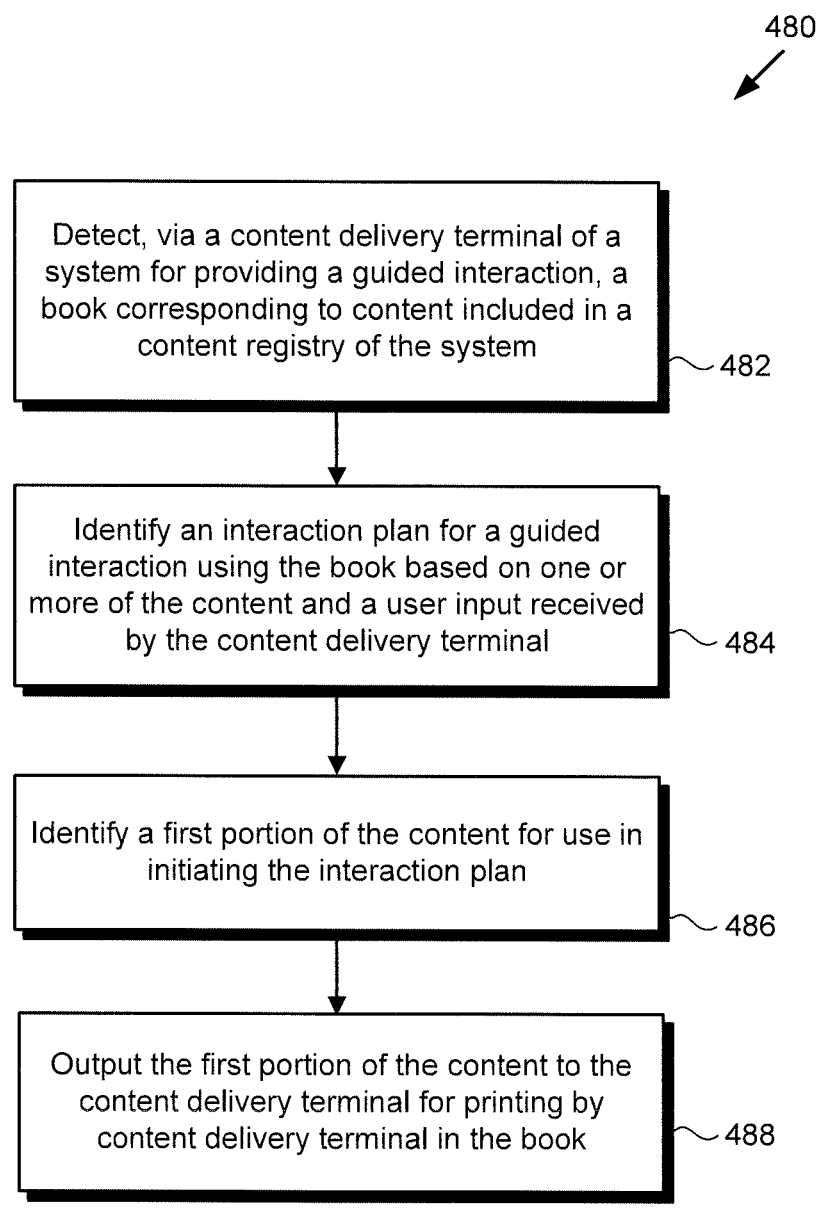
FIG. 4 is a flowchart presenting an exemplary method for use by a system for providing guided interactions with books.

System 100 for providing guided interactions with books, such as book 260/360, will be further described below with reference to FIG. 4. FIG. 4 presents flowchart 480 outlining an exemplary method for use by a system for providing guided interactions with books. With respect to the method outlined in FIG. 4, it is noted that certain details and features have been left out of flowchart 480 in order not to obscure the discussion of the inventive features in the present application. In addition, it is emphasized that the exemplary method outlined by flowchart 480 may be executed substantially concurrently for multiple guided interactions for different system user(s) 140a/140b/240 having different books 260/360. That is to say, the method outlined by flowchart 480 may be executed substantially concurrently for each of tens, hundreds, or thousands of individual system users corresponding to system user(s) 140a/140b/240.

Flowchart 480 begins with detecting, via one of content delivery terminal(s) 130a/130b/230, book 260/360 corresponding to content 119 included in content registry 118 (action 482). As discussed above, book 260/360 may include content identifier 364 readable by sensor(s) 254 of content delivery terminal(s) 130a/130b/230. Moreover, and as also discussed above, content delivery terminal(s) 130a/130b/230 is/are communicatively coupled to computing platform 102 via communication network 124 and network communication links 222. Thus, according to the exemplary implementation shown in FIG. 1, detection of book 260/360 corresponding to content 119 included in content registry 118 may be performed by content delivery software code 110, executed by hardware processor 104, and based on terminal interaction data 144 generated by sensor(s) 254 and received from one of content delivery terminal(s) 130a/130b/230.

Flowchart 480 continues with identifying one of interaction plans 114a or 114b for the guided interaction using book 260/360, based on one of more of content 119 and a user input received by one of content delivery terminal(s) 130a/130b/230 (action 484). In one implementation, one of interaction plans 114a or 114b may be identified for the guided interaction at random, based solely on content 119. Alternatively, in some implementations, one of interaction plans 114a or 114b may be identified for the guided interaction based on content 119 and one of user activity profile 117a and 117b corresponding to the system user in possession of book 260/360. As yet another alternative, one of interaction plans 114a and 114b may be identified for the guided interaction based on content 119 and terminal interaction data 144 corresponding to an input from one of system user(s) 140a/140b/240, such as an input in response to a query communicated via one of content delivery terminal(s) 130a/130b/230.

As a specific example of the latter use case, in one implementation, system user(s) 140a/140b/240 may enjoy a "create your own storybook" experience by entering venue 142 in the form of a retail store, and obtaining blank book 260/360. System user(s) 140a/140b/240 open(s) book 260/360 to the first page and slides book 260/360 into one of content delivery terminal(s) 130a/130b/230. Content delivery terminal(s) 130a/130b/230 ask(s) if the main character in the story to be printed is a horse or a dog. System user(s) 140a/140b/240 provide(s) an input selecting horse, and one of interaction plans 114a and 114b is identified at least partially on that user input.

It is noted that although user activity profiles 117a and 117b may be used to identify one of interaction plans 114a and 114b in action 484, user activity profiles 117a and 117b are exclusive of personally identifiable information (PII) of system user(s) 140a/140b/240. Thus, system 100 is merely able to distinguish an anonymous system user with whom a previous interaction has occurred from anonymous system users having no previous interaction experience with system 100. Moreover, user actions database 116 retains no information describing the age, gender, race, ethnicity, or any other PI of any of system user(s) 140a/140b/240.

In some implementations, the guided interaction includes a guided narrative, and interaction plans 114a and 114b are alternative storylines for the guided narrative. In other implementations, the guided interaction includes a game, and interaction plans 114a and 114b are alternative series of instructions to be completed by system user(s) 140a/140b/240 participating in the game. For example, in one such implementation, the game may be a scavenger hunt. Identification of one of interaction plans 114a or 114b for the guided interaction using book 260/360, based on one of more of content 119 and a user input received by one of content delivery terminal(s) 130a/130b/230, may be performed by content delivery software code 110, executed by hardware processor 104.

Flowchart 480 continues with identifying first portion 126a/326a of content 119 for use in initiating the interaction plan (action 486). Returning to the "create your own storybook" example use case introduced above, in which system user(s) 140a/140b/240 selected a horse as the main character in a story to be printed in book 260/360, action 486 may include identifying graphical image 329 and an introductory text as first portion 126a/326a of content 119 for initiating the interaction plan.

First portion 126a/326a of content 119 for initiating the guided interaction may be identified based on the interaction plan identified in action 484, and in some implementations, may also be identified based on one or more of an input from system user(s) 140a/140b/240 and or one of user activity profiles 117a and 117b. First portion 126a/326a of content 119 for initiating the guided interaction may be identified by content delivery software code 110, executed by hardware processor 104.

Flowchart 480 may conclude with outputting first portion 126a/326a of content 119 for printing by one of content delivery terminal(s) 130a/130b/230 in book 260/360 (action 488). Action 488 may be performed by content delivery software code 110, executed by hardware processor 104. First portion 126a/326a of content 119 may be output by computing platform 102 to one of content delivery terminal(s) 130a/130b/230 for printing in book 260/360 using printer 234. The result of action 488 is shown in FIG. 3A in which first portion 126a/326a of content 119 has been printed in book 260/360.

After first portion 126a/326a of content 119 is printed in book 260/360, system user(s) 140a/140b/240 can then keep going to different content delivery terminals 130a/130b/230 that add additional content to their story. Actions by system user(s) 140a/140b/240 can be tracked along the way, so that game instructions, story elements, or the storyline can be dynamically changed based on the user actions. Thus, hardware processor 104 may further execute content delivery software code 110 to identify second portion 126b/326b of content 119 for use in continuing the storyline for the guided narrative, and to output second portion 126b/326b of content 119 to either the one of content delivery terminal(s) 130a/130b/230 that printed first portion 126a/326a of content 119 in book 260/360, or to another of content delivery terminal(s) 130a/130b/230, for printing in book 260/360.

In addition, in some implementations, physical interactions may be included. For example, the following may be printed on one of enumerated pages 362 of book 260/360: "Firefly has wandered out of his corral and has gotten lost." Then one of content delivery terminal(s) 130a/130b/230 tells system user(s) 140a/140b/240 to find Firefly. The system user can then take book 260/360 and look around venue 142 for a figurine or stuffed animal depicting the horse Firefly. When system user(s) 140a/140b/240 find(s) the figurine or stuffed animal, he/she/they return to one of content delivery terminal(s) 130a/130b/230 where an RFID tag or other identifier affixed to the figurine or stuffed animal can be detected.

As noted above, in some implementations, the guided interaction provided by system 100 includes a game, and interaction plans 114a and 114b are alternative series of instructions to be completed by system user(s) 140a/140b/240 participating in the game. In those implementations, first portion 126a/326a of content 119 may include one or more initial instructions of the series of instructions to be completed by system user(s) 140a/140b/240.

Moreover, in those implementations, hardware processor 104 may be configured to continue the game by executing content delivery software code 110 to detect completion of one or more of the series of instructions included in first portion 126a/326a of content 119 by system user(s) 140a/140b/240, and to identify second portion 126b/326b of content 119 for use in continuing the game. Hardware processor 104 may then execute content delivery software code 110 to output second portion 126b/326b of content 119 to either the one of content delivery terminal(s) 130a/130b/230 that printed first portion 126a/326a of content 119 in book 260/360, or to another of content delivery terminal(s) 130a/130b/230, for printing in book 260/360.

For example, and referring to FIG. 1, first portion 126a/326a of content 119 received by system user 140a from content delivery terminal 130a might instruct system user 140a to travel to interaction site 150, either to obtain an object, ascertain a fact, or simply to be present at interaction site 150. In one implementation, completion of that action may be detected by content delivery software code 110, executed by hardware processor 104, through receipt of sensor data 156 from sensor(s) 154 at interaction site 150. In other implementations, system user 140a may be instructed to return to content delivery terminal 130a, or to proceed to content delivery terminal 130b, in which use cases completion of the instructed action may be detected by content delivery software code 110, executed by hardware processor 104, through receipt of terminal interaction data 144.

As another example, first portion 126a/326a of content 119 received by system user 140b from content delivery terminal 130b might instruct system user 140b to interact with system agent 152, either to obtain an object, ascertain a fact, or simply to be in the presence of system agent 152. In some implementations, completion of that action may be detected by content delivery software code 110, executed by hardware processor 104, through receipt of sensor data 156 from sensor(s) 154 located on or near system agent 152, or through receipt of system agent interaction data 128 from system agent 152. In other implementations, system user 140b may be instructed to return to content delivery terminal 130b, or to proceed to content delivery terminal 130a, in which use cases completion of the instructed action may be detected by content delivery software code 110, executed by hardware processor 104, through receipt of terminal interaction data 144.

In yet another exemplary implementation, system user(s) 140a/140b/240 may enjoy a "choose your own action adventure" within venue 142 in the form of a theme park or resort property. In one such use case, system user(s) 140a/140b/240 may insert book 260/360 into one of content delivery terminal(s) 130a/130b/230 and have it print out the prompt. "You are in a faraway land without any communication. Look around for a communication tower to signal your ship." Then system user 140a/140b/240 takes book 260/360 from content terminal(s) 130a/130b/230 and reads the prompt. System user(s) 140a/140b/240 look(s) around and notices what looks like a radio antenna at interaction site 150. System user(s) 140a/140b/240 travel(s) to the antenna at interaction site 150 and sees a spot where she/he/they can tap book 260/360. System user(s) 140a/140b/240 tap(s) book 260/360 to the antenna and the whole antenna lights up. Unknown to system user(s) 140a/140b/240, the antenna at interaction site 150 has sensor(s) 154 in form of an RFID reader on it. Additionally, the antenna at interaction site 150 may be communicatively connected to computing platform 102. Now when the system user(s) 140a/140b/240 return(s) to one of content delivery terminal(s) 130a/130b/230 and slide(s) book 260/360 into the terminal, completion of the instruction is detected, and more text and/or further instructions can be printed in book 260/360. For example, content delivery terminal(s) 130a/130b/230 may print: "I've found the communication tower. When I tried to power it up it died down. We need an additional power source. I'll look around for a battery or something that can power it up. I think I need to look north." Now system user 140a/140b/240 has a new call to action and can continue their action adventure to find a battery.

Thus, the present application discloses systems and methods for providing guided interactions with books. The systems and methods disclosed in the present application provide information content in a form that advantageously preserves the experience of enjoying books, while concurrently delivering the efficiencies and advantages available from modern electronically based information technologies, such as real-time interactivity and responsiveness to user actions.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for providing a guided interaction, the system comprising:
   a content delivery terminal;
   a computing platform communicatively coupled to the content delivery terminal, the computing platform including a hardware processor and a memory;
   the memory storing a content delivery software code, a content registry, and a library of entries corresponding respectively to a plurality of interaction plans for the guided interaction;
   wherein the hardware processor is configured to execute the content delivery software code to:
      detect, via the content delivery terminal, a book corresponding to a content included in the content registry;
      identify an interaction plan of the plurality of interaction plans for the guided interaction based on at least one of the content or a user input received by the content delivery terminal;
      identify a first portion of the content for use in initiating the interaction plan; and
      output the first portion of the content to the content delivery terminal for printing by the content delivery terminal in the book.

2. The system of claim 1, wherein the content delivery terminal is configured to print the content in the book by stamping the content on at least one page of the book.

3. The system of claim 1, wherein the content delivery terminal comprises a radio-frequency identification (RFID) reader, and wherein the book includes an RFID tag identifying the book.

4. The system of claim 1, wherein the first portion of the content comprises a graphical image.

5. The system of claim 1, wherein the content delivery terminal is situated in one of a retail store, a theme park, a resort property, or a cruise ship.

6. The system of claim 1, wherein the guided interaction comprises a guided narrative, and wherein the interaction plan comprises a storyline for the guided narrative.

7. The system of claim 6, wherein the hardware processor is further configured to execute the content delivery software code to:
   identify a second portion of the content for use in continuing the storyline for the guided narrative; and
   output the second portion of the content to one of the content delivery terminal or another content delivery terminal of the system for printing by the one of the content delivery terminal or the another content delivery terminal in the book.

8. The system of claim 1, wherein the guided interaction comprises a game, and wherein the interaction plan includes a series of instructions to be completed by a user participating in the game.

9. The system of claim 8, wherein the hardware processor is further configured to execute the content delivery software code to:
   detect completion of at least one of the series of instructions by the user;
   identify a second portion of the content for use in continuing the game; and
   output the second portion of the content to one of the content delivery terminal or another content delivery terminal of the system for printing by the one of the content delivery terminal or the another content delivery terminal in the book.

10. The system of claim 8, wherein the game is a scavenger hunt.

11. A method for use by a system for providing a guided interaction, the system comprising a content delivery terminal communicatively coupled to a computing platform including a hardware processor and a memory storing a content delivery software code, a content registry, and a library of entries corresponding respectively to a plurality of interaction plans for the guided interaction, the method comprising:
   detecting via the content delivery terminal, by the content delivery software code executed by the hardware processor, a book corresponding to a content included in the content registry;
   identifying, by the content delivery software code executed by the hardware processor, an interaction plan of the plurality of interaction plans for the guided interaction based on at least one of the content or a user input received by the content delivery terminal;
   identifying, by the content delivery software code executed by the hardware processor, a first portion of the content for use in initiating the interaction plan; and
   outputting the first portion of the content, by the content delivery software code executed by the hardware processor, for printing by the content delivery terminal in the book.

12. The method of claim 11, wherein the content delivery terminal is configured to print the content in the book by stamping the content on at least one page of the book.

13. The method of claim 11, wherein the content delivery terminal comprises a radio-frequency identification (RFID) reader, and wherein the book includes an RFID tag identifying the book.

14. The method of claim 11, wherein the first portion of the content comprises a graphical image.

15. The method of claim 11, wherein the content delivery terminal is situated in one of a retail store, a theme park, a resort property, or a cruise ship.

16. The method of claim 11, wherein the guided interaction comprises a guided narrative, and wherein the interaction plan comprises a storyline for the guided narrative.

17. The method of claim 16, further comprising:
identifying, by the content delivery software code executed by the hardware processor, a second portion of the content for use in continuing the storyline for the guided narrative; and
outputting the second portion of the content to one of the content delivery terminal or another content delivery terminal of the system, by the content delivery software code executed by the hardware processor, for printing by the one of the content delivery terminal or the another content delivery terminal in the book.

18. The method of claim 11, wherein the guided interaction comprises a game, and wherein the interaction plan includes a series of instructions to be completed by a user participating in the game.

19. The method of claim 18, further comprising:
detecting, by the content delivery software code executed by the hardware processor, completion of at least one of the series of instructions by the user;
identifying, by the content delivery software code executed by the hardware processor, a second portion of the content for use in continuing the game; and
outputting the second portion of the content to one of the content delivery terminal or another content delivery terminal of the system, by the content delivery software code executed by the hardware processor, for printing by the one of the content delivery terminal or the another content delivery terminal in the book.

20. The method of claim 18, wherein the game is a scavenger hunt.

* * * * *